United States Patent [19]

Roos

[11] Patent Number: 4,687,387

[45] Date of Patent: Aug. 18, 1987

[54] CUTTING TOOL

[75] Inventor: Aage V. Roos, Skärplinge, Sweden

[73] Assignee: Santrade Limited, Lucerne, Switzerland

[21] Appl. No.: 874,680

[22] Filed: Jun. 16, 1986

[30] Foreign Application Priority Data

Jun. 17, 1985 [SE] Sweden .................. 8502979

[51] Int. Cl.$^4$ .................. B23B 51/02; B23C 5/18
[52] U.S. Cl. .................. 408/144; 408/230; 408/713; 407/54
[58] Field of Search .......... 408/144, 188, 196, 225, 408/224, 223, 230, 713; 407/54

[56] References Cited

U.S. PATENT DOCUMENTS 2,858,718 11/1958 Kohler .................. 408/144
3,017,790 1/1962 Werle .................. 408/144
4,132,493 1/1979 Hosoi .................. 407/54 X
4,222,690 9/1980 Hosoi .................. 407/54 X Primary Examiner—Z. R. Bilinsky
Attorney, Agent, or Firm—Burns, Doane, Swecker & Mathis

[57] ABSTRACT

A cutting tool, a drill for instance, having a drill body and a cutting portion. The cutting portion comprises a central cutting insert and two peripheral cutting inserts. A cutting edge extends along the three inserts. The inserts comprise surfaces for facilitating a tight connection between the parts of the cutting edge. The peripheral inserts consist of a material of greater hardness than the material in the central insert, and therefore the cutting edge is adapted for the varying cutting speeds in the radial direction of the tool.

11 Claims, 8 Drawing Figures

CUTTING TOOL

BACKGROUND OF THE INVENTION

The present invention relates to a cutting tool for chip removing machining. The tool comprises a tool body which has a shank, at least one chip gullet, at least one insert-receiving site arranged in the working end of the tool body, and a cutting portion. The cutting portion consists of at least two cutting inserts assembled in the working end of the tool, one of which consists of a material which has a different hardness relative to another cutting insert. The cutting edges of the cutting inserts transites mainly continuously straight into each other.

Hitherto known drills which have two cutting inserts brazed into the working end of the drill, have cutting inserts of equal hardness along the cutting edge in the radial direction of the drill. The material in both of the cutting inserts is a compromise between a soft material which has an excellent resistance to compressive stress arising in the centre of the drill and a hard material which has an excellent resistance to the high cutting speed arising in the periphery of the drill. The material chosen for the cutting inserts thus is one which is fairly resistant to compressive stress and which is fairly resistant to high cutting speed, and therefore the cutting edge of the drill will not have an optimum working life. The joint between these two cutting inserts is centrally positioned in the drill which reduces the strength of the centre.

An object with the present invention is to provide a cutting tool whose cutting inserts are of different hardness in order to achieve an optimized cutting result.

Another object is to arrange joints between the cutting inserts such that the soldering result is optimized.

Still another object is to arrange the joint such that the joint will not impact on the work piece surface.

These and other objects are achieved by a cutting tool according to the present invention.

THE DRAWINGS

The invention will be more closely described hereinafter with reference to the appended drawings wherein further characterizing features of and advantages with the invention become apparent.

DESCRIPTION OF PREFERRED EMBODIMENTS OF THE INVENTION

Figure 1:
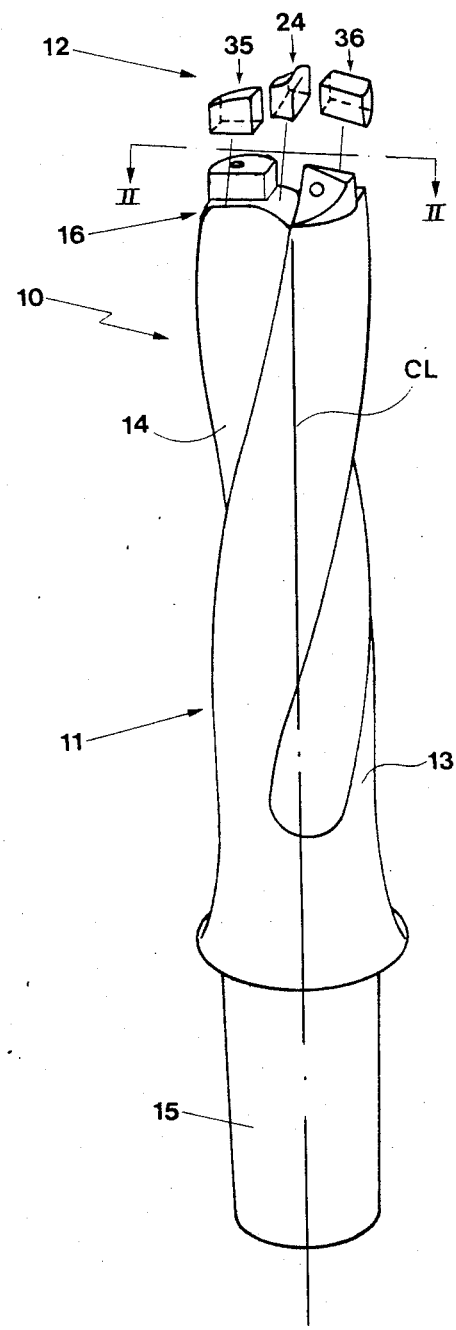
FIG. 1 shows a drill according to the invention in a perspective view.
Figure 2:
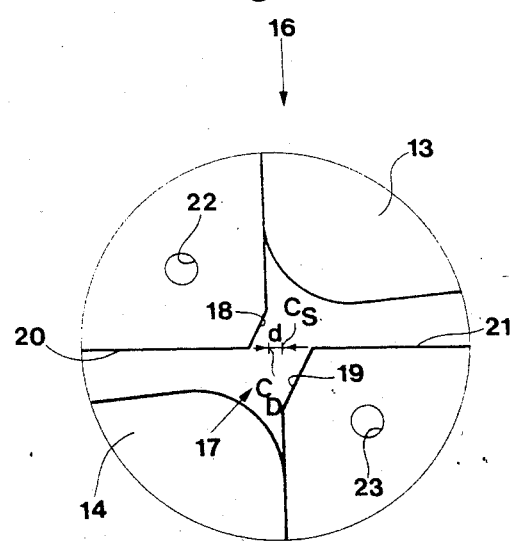
FIG. 2 shows the drill in a top view.

In FIGS. 1–6 a drill 10 according to the invention is shown. The drill 10 comprises a drill 11 and a cutting portion 12. The drill body 11 has a mainly cylindrical basic form. The drill body has screw-shaped chip gullets 13,14, a fastening portion 15, and a working end 16 which includes an insert-receiving site. The working end 16 has a longitudinally facing mainly planar first support surface 17, which is perpendicularly arranged with respect to the centerline CL of the drill. The working end 16 is provided with a slot in the centre of the drill body, whose walls 18,19 are perpendicular to the support surface 17. The slot is displaced relative to the centre $C_D$ of the drill body such that the centre $C_S$ of the slot is arranged at a distance d relative to the centre $C_D$ of the drill body. Each wall 18,19 forms an obtuse internal angle with a connected second support surface 20,21, which is mainly planar and faces circumferentially. The second support surfaces 20,21 coincide with a radial plane, perpendicular to the first support surface 17. Flush channels 22,23 terminate in surfaces which have the shape of conical segments.

Figure 3:
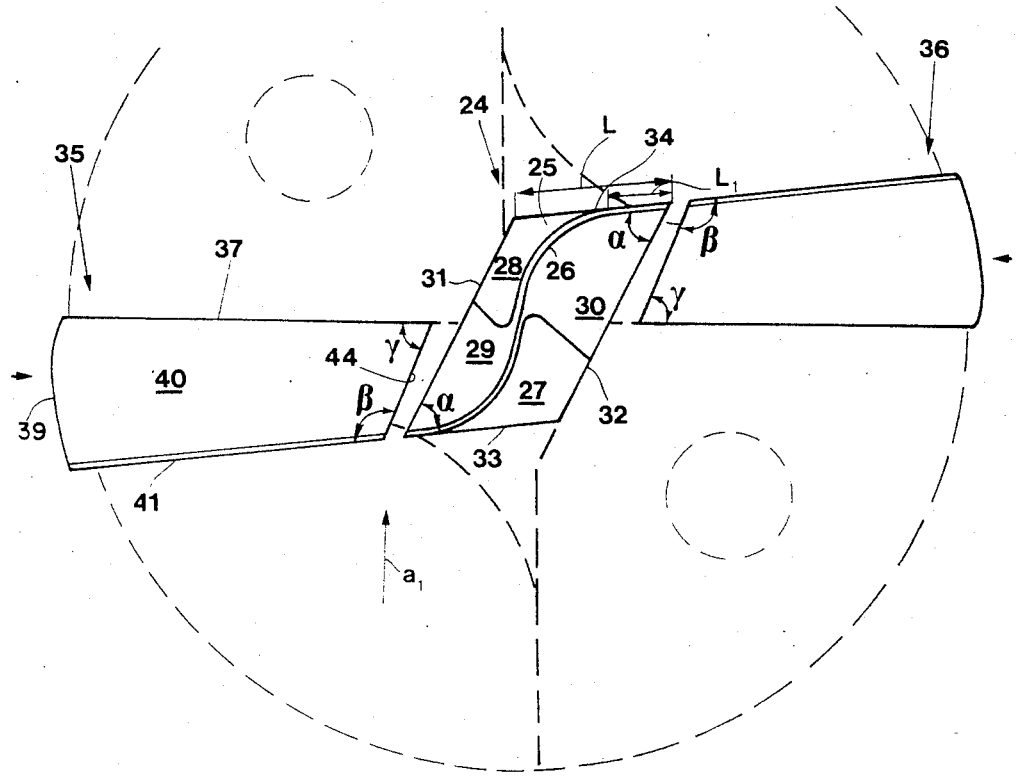
FIG. 3 shows cutting inserts in a top view.
Figure 4:
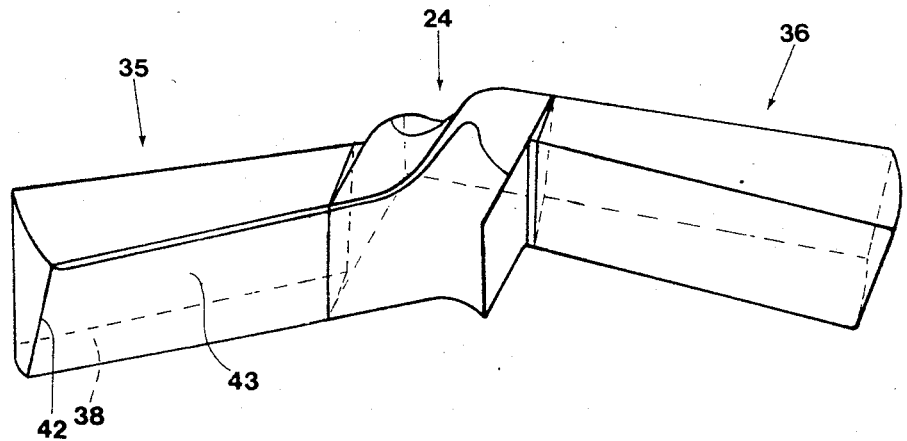
FIG. 4 shows the cutting inserts in a perspective view.

FIGS. 3 and 4 show cutting inserts provided to be secured to the drill body. The drill body is shown with dotted lines in FIG. 3. The first or central cutting insert 24 has a mainly rhombical basic form, one major surface 25 of which has an S-shaped cutting edge 26. The cutting edge 26 has an asymmetrical extension from one acute-angled corner to another. The cutting edge 26 is surrounded by chip surfaces 27,28 and clearance surfaces 29,30. The acute-angled corner of the cutting insert 24 forms an angle $\alpha$ between 45°–75°, preferably 55°–65°. The major sides 31,32 of the cutting insert are connected to the minor sides 33,34 in the acute-angled corner and in the obtuse-angled corner. The cutting edge 26 touches or is parallel with respective minor sides 33,34 on a largest distance $L_1$ from the end of the minor side in the acute-angled corner. This distance $L_1$ is approximately 0.1–0.6 times the length of the minor side 34, preferably 0.3–0.4 times. The corresponding distance at the opposite acute-angled corner is in every case shorter than the distance $L_1$. The cutting insert consists of a material, hard metal or steel, for instance, which is adapted to resist compressive strength and wear.

The cutting insert 24 is partly surrounded by two second and third radially outer cutting inserts 35,36, which are identical in geometry, but different in length, and therefore only the cutting insert 35 is described hereinafter. The cutting insert 35 has a polygonal basic shape and it comprises circumferentially facing, mainly planar supporting surfaces 37,38, which are mainly perpendicular to each other, clearance surfaces 39 and 40 for the main cutting edge 41 and minor cutting edge 42, a chip surface 43, and a radially inner, plane side surface 44. The side surface 44 forms an obtuse angle $\alpha$ with the cutting edge 41 and an acute angle $\gamma$ with the supporting surface 37 intersecting the cutting edge 41. The cutting inserts 35,36 consist of a material, for example hard metal or steel, which is harder than the material of the central cutting insert 24. The object of the difference in hardness is that the peripheral cutting inserts 35,36 have a higher cutting speed than the central cutting insert 24, and therefore the former should consist of a material having an increased hardness. These cutting inserts 35,36 will thus become more brittle as the toughness decreases with increasing hardness for the materials. A hard but brittle material will not endure the compressing stresses arising in the centre of the drill, and therefore a softer but tougher material is chosen for the central cutting insert 24 whose cutting speed is lesser. The central cutting insert is mounted, preferably by brazing, in the slot of the working end 16, so that approximately half of each of its major sides 31, 32 is secured to the connected slot wall 18,19, and so that the lower major surface is secured to the support surface 17. Then melted brazing material is applied to the support surfaces 17,20,21 of the drill body and the major sides 31,32 of the central cutting insert 24, whereafter the peripheral cutting inserts 35,36 are pushed in the direction of the arrows in FIG. 3. The obtuse-angled corners of the peripheral cutting inserts 35,36 abut against the corresponding acute-angled corners of the central cutting insert 24, and therefore the supporting surfaces 37 of the peripheral cutting inserts are forced towards the support surfaces 20,21 of the drill body, and the cutting edges 41,26 will be joined in a mainly continuous, straight way. The angle $\beta$ is nearly a complementary angle to the angle $\alpha$; the difference is 1° to 4°, and therefore the brazed joints between the central and peripheral cutting inserts become wedge-shaped, whose apex is arranged in the joint between the cutting edges. This apex should be as narrow as possible so that the work material cannot wedge into the joint and break the inserts. An advantage with the inclination of the support surface 44 is that if a shiver is knocked from the softer cutting edge 26, the boring operation may continue due to the cutting edge formed behind said edge 26 in the cutting force direction $a_1$ in the line of junction between the support surface 44 and the clearance surface 40.

Figure 5:
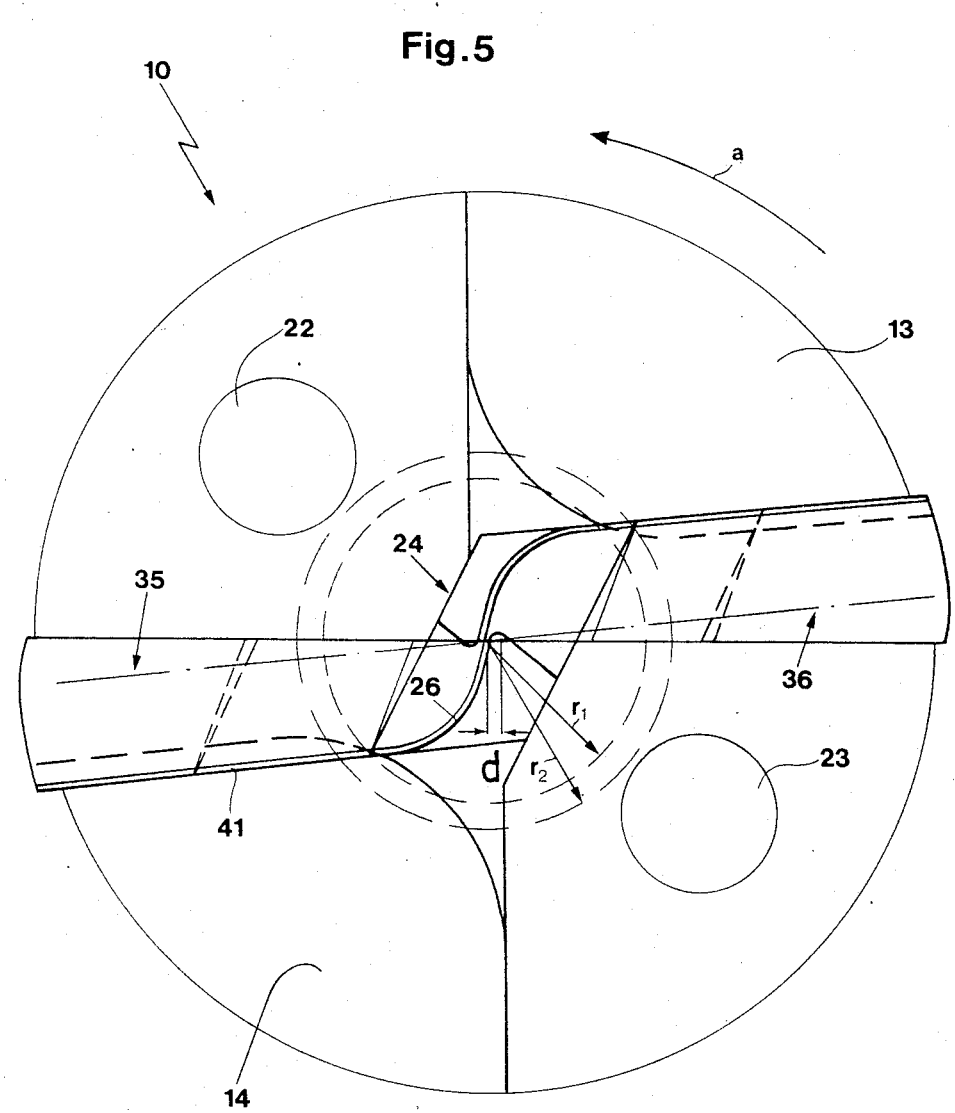
FIG. 5 shows the drill in a top view.
Figure 6:
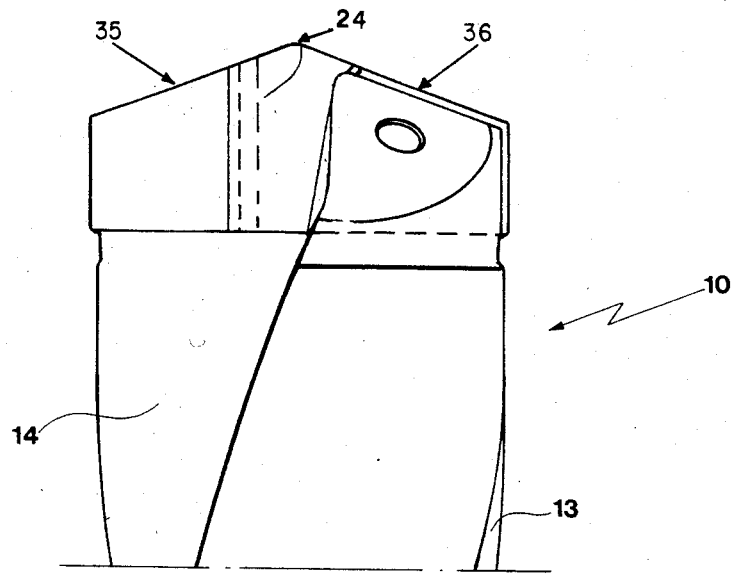
FIG. 6 shows a part of the drill in a side view.

FIGS. 5 and 6 show the drill in a top view and a side view, respectively. The central cutting insert 24 has been brazed to the slot so that the centre of the central cutting insert is arranged at a distance d from the centre of the drill. This results in that the acute-angled corners of the insert 24 are placed at different distances from the centre of the drill. The lower, left corner in FIG. 5 touches a circle defined by the radius $r_1$, while the upper, right corner touches a circle defined by the radius $r_2$. The joints between the central cutting insert 24 and the peripheral inserts 35,36 are thus displaced relative to each other, and therefore possible ridges in the bottom of the hole in the work piece, caused by the joints, will be cut by the following cutting edge 26 or 41. In FIG. 5 there are dotted lines to illustrate the possibility to insert further cutting inserts of different hardness in the working end of the drill body.

Conventional drills where the cutting inserts meet in a central joint are sometimes susceptible to breakage in connection to the joint, which has a negative influence on the drilling operation. The central portion of the cutting portion of the presently claimed tool is homogeneous, and therefore the above-mentioned drawback is avoided. The shapes of the cutting edges and the chip surfaces are more closely described in the U.S. Pat. No. 4,222,690 which hereby is incorporated in the description.

Figure 7:
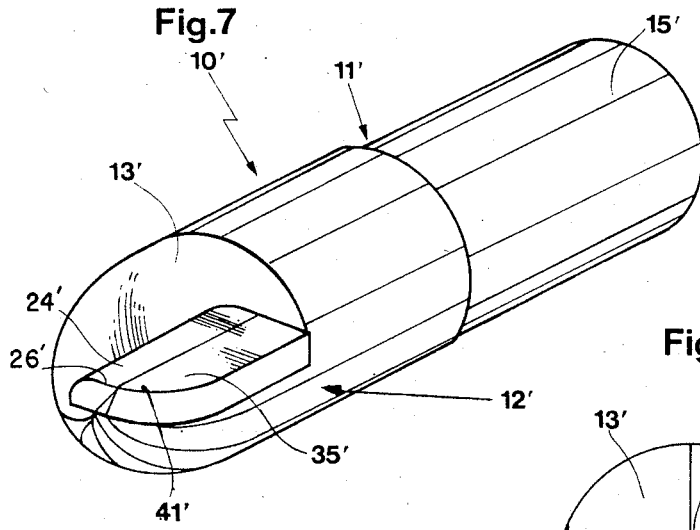
FIG. 7 shows an end milling cutter according to the invention in a perspective view.
Figure 8:
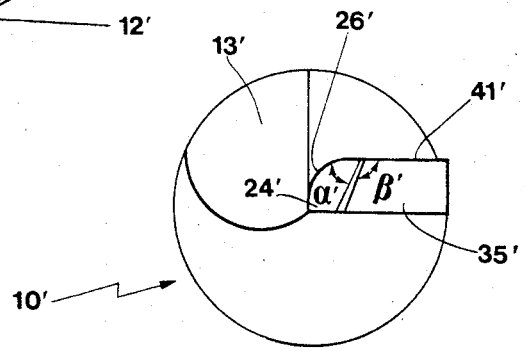
FIG. 8 shows the end milling cutter in a top view.

FIGS. 7 and 8 show a drilling end milling cutter according to the invention. The end mill 10' comprises a cylindrical body 11' and a cutting portion 12'. The body 11' has a shank 15', a chip gullet 13', and an insert-receiving site. The cutting portion 12' consists of two cutting inserts 24',35'. The radially innermost insert 24', which has a lesser hardness than the outermost insert 35', has been secured to the site by brazing. Then the insert 35' has been secured so that its cutting edge 41', at least when seen in a top view, is continuously straight with the cutting edge 26' of the insert 24'. The cutting edge 26' starts in or adjacent to the centre of the milling cutter, whereafter it is continuously bent in direction from the centre. Then the cutting edge 26' assumes a straight shape radially inside the cutting edge 41' of the outermost insert 35'. The brazed joint between the inserts has the shape of a wedge whose apex is positioned between the cutting edges 26',41'. This apex is very narrow, merely a film. Equal to the first-mentioned embodiment of the invention the obtuse angle $\beta'$, between the radially inner side surface of the insert 35' and the cutting edge 41', is nearly a complementary angle to the acute angle $\alpha'$; the difference is 1° to 4°, between the radially outermost side surface of the insert 24' and the cutting edge 26' at its straight portion. The configuration of the cutting edges and the chip surfaces of the end mill are more closely described in the U.S. Pat. No. 4,132,493, which hereby is incorporated in the description.

Alternatively at least one further cutting insert may replace a part of one of the inserts, in this embodiment.

The present invention relates to a cutting tool which has a cutting portion adapted for the varying cutting speeds in the radial direction of the tool. The cutting portion is safely secured in the tool body and in drills it has a homogeneous centre.

I claim:

1. A cutting tool comprising:
   a tool body including a shank rotatable about a longitudinal axis;
   at least one chip gullet formed in said shank;
   at least one insert-receiving site arranged in a forward working end of the shank;
      said insert-receiving site including a longitudinally forwardly facing support surface and a circumferentially facing support surface extending forwardly from said forwardly facing support surface, and
   cutting means comprising at least first and second cutting inserts seated on said forwardly facing support surface, said first insert disposed radially inside of said second insert and formed of a softer material than said second insert, said first insert including a first cutting edge and a first side surface intersecting said first cutting edge; said second insert including a second cutting edge, a second side surface intersecting said second cutting edge, and a circumferentially facing supporting surface;
      said circumferentially facing supporting surface bonded to said circumferentially facing support surface of said shank,
      said first and second side surfaces facing and abutting one another such that said first and second cutting edges are substantially continuously arranged,
      each of said first and second side surfaces oriented at an acute angle relative to said circumferentially facing supporting surface and said circumferentially facing support surface such that said first side surface imparts a force to said second insert urging said circumferentially facing supporting surface against said circumferentially facing support surface.

2. A cutting tool according to claim 1, wherein an end of said first cutting edge which joins with said second cutting edge forms an acute angle with said first side surface, said second side surface forming an obtuse angle with said cutting edge.

3. A cutting tool according to claim 2, wherein said acute angle lies in a range of from 45 to 75 degrees.

4. A cutting tool according to claim 3, wherein said acute angle lies in a range of from 55 to 65 degrees.

5. A cutting tool according to claim 3, wherein said first and second side surfaces define therebetween an cute angle in a range of from 1 to 4 degrees, said last-named acute angle having an apex at an intersection of said first and second cutting edges.

6. A cutting tool according to claim 1, wherein said first and second side surfaces define therebetween an acute angle having an apex at an intersection of said first and second cutting edges, and a bonding material disposed in said angle forming a wedge-shaped joint between said first and second side surfaces.

7. A cutting tool according to claim 6, wherein said acute angle defined between said first and second side surfaces lies in a range of from 1 to 4 degrees.

8. A cutting tool according to claim 1, wherein said insert receiving site includes an additional circumferentially facing support surface extending forwardly from said forwardly facing support surface at a location spaced about 180 degrees from said first-named circumferentially facing support surface, said first insert including an additional side surface spaced opposite said first side surface and intersecting said first cutting edge, said cutting means including a third insert seated on said forwardly facing support surface said third insert including a third cutting edge, a third side surface intersecting said third cutting edge, and an additional circumferentially facing supporting surface, said additional circumferentially facing supporting surface abutting said additional circumferentially facing support surface of said shank, said third side surface facing and abutting said additional side surface of said first insert such that said first and third cutting edges are substantially continuously arranged, said third and additional side surfaces oriented at an acute angle relative to said additional circumferentially supporting surface and said additional circumferentially facing support surface such that said additional side surface imparts a force to said third insert urging said additional circumferentially facing supporting surface against said additional circumferentially facing support surface.

9. A cutting tool according to claim 8, wherein said working end of said shank includes a pair of mutually facing, spaced apart walls extending longitudinally forwardly from said forwardly facing supporting surface, said walls defining a slot receiving said first insert, said first insert being of substantially rhombic shape including two minor surfaces and two major sides defined by said first and additional side surfaces, respectively, said major sides abutting respective ones of said walls, said slot being oriented such that its center is offset radially from said longitudinal axis of rotation such that a first point of intersection of said first and second cutting edges is spaced from said axis of rotation by a different distance than second point of intersection of said first and third cutting edges is spaced from said axis of rotation.

10. A cutting tool according to claim 9, wherein said major surfaces intersect respective ones of said minor sides to form acute angle corners diagonally opposed from one another, said first cutting edge being substantially S-shaped and extending from one of said acute angle corners to the other, said first cutting edge intersecting said axis of rotation.

11. A cutting tool according to claim 10, wherein said first cutting edge includes substantially straight ends which are parallel to a respective said minor side.

* * * * *